UNITED STATES PATENT OFFICE.

EDWARD WATSON, OF GRAND RAPIDS, MICHIGAN.

MATERIAL FOR WALL DECORATION AND METHOD OF MAKING SAME.

SPECIFICATION forming part of Letters Patent No. 522,636, dated July 10, 1894.

Application filed February 10, 1894. Serial No. 499,785. (No specimens.)

*To all whom it may concern:*

Be it known that I, EDWARD WATSON, a citizen of the United States, residing at Grand Rapids, in the county of Kent and State of Michigan, have invented certain new and useful Improvements in Material for Wall Decoration and Methods of Making the Same, of which the following is a specification.

My invention relates to that class of compounds for calcimine or wall decoration, composed essentially of calcined gypsum as the principal pigment or body, and an adhesive agent, to which may be added any coloring matter or paints, or sulphate of zinc, alum, &c., which are supposed by some manufacturers to improve the product. These compounds for wall finish are furnished to the trade in a dry powder, which may be used by simply mixing with water. Such products are made by incorporating liquid glue with calcined gypsum, then drying the mixture by heat, and subsequently grinding the product. However, all such compounds for wall finish which contain glue are subject to certain disadvantages pertaining to the nature of glue. Among which may be mentioned: first, soon after mixing with water for use the mixture becomes gelatinous, especially in a cold room. After applied to a wall, when dry, the glue alternately swells and shrinks, causing cracks and scaling off, and in the process of manufacture, the first difficulty encountered is from disagreeable decomposition of the liquid glue. Another serious difficulty is that notwithstanding the restraining effect of the glue, the water of the liquid glue when mixed with calcined gypsum will chemically unite with the calcined gypsum, which seriously injures the product, and to prevent this as much as possible, great haste must be resorted to in drying the mixture.

By my invention I have practically overcome the objections above mentioned as pertaining to any direct mixture of glue and calcined gypsum. I also produce material of improved qualities as to its body or covering power, spreading or flowing from the brush, and permanency and beauty of finish when applied.

In making material by my process if desirable to make a variety of colors or tints, any coloring matter or paints may be added, or I may add to the compound, sulphate of zinc, alum, &c., but do not consider such additions as a necessary part of my invention. In making such additions to the compound, they may be added at any stage of the process, or mixed with the dry product before or after grinding.

The process by which my improved adhesive wall coating is made is practically as follows: I start out with animal glue, which may be dry, or its equivalent quantity of liquid glue as made by the glue maker before drying. Estimating the glue as dry, and preferably ground, I take of dry glue one hundred pounds, add to it twenty five gallons of water, let it rest until the glue softens, then add ten pounds of lime (recently burned or slaked), then boil the mixture half an hour, and add to the mixture fifteen pounds of oxalic acid, and ten pounds of rosin, and occasionally stir the mixture for half an hour without boiling, then thoroughly incorporate with the adhesive mixture one thousand pounds of calcined gypsum, then expel the water by heat, and subsequently reduce the product to a very fine powder, which is my improved adhesive wall coating, which may then be used at any subsequent time by simply mixing with water.

I do not limit my invention to the precise proportions or treatment described, as these may be varied considerably without departing from the spirit of my invention, or impairing the usefulness of the product.

The special discovery upon which my invention rests is the composition of, properties of, and special advantages derived from the adhesive mixture I use in combination with calcined gypsum. Of this new adhesive ingredient of my wall covering compound, which for the purpose of description in my claim, I shall call "metagelatin," I desire to call special attention, not only to its properties as compared with liquid glue, but to its advantages over liquid glue as an adhesive agent in this class of compounds for wall coating. In the process of preparing this new adhesive mixture, certain chemical changes have occurred, a new chemical substance obtained, which has lost the distinguishing property of liquid glue; namely, the property of becoming gelatinous when cold.

I do no not claim originality in boiling liquid glue with lime, but my claim is based upon the combined properties of my new adhesive mixture, and its use for the purpose of my invention.

The advantageous properties of this adhesive mixture depend not only upon its physical properties as compared with liquid glue, but upon the ultimate results when combined with the process of incorporating it with calcined gypsum.

The peculiar properties of this new adhesive mixture have been brought about by the combined action of the glue, lime, rosin, oxalic acid, water, heat, and time of boiling. It will be seen that when this new adhesive mixture is ready to incorporate with the calcined gypsum, it contains the chemically changed glue, which I call "metagelatin," oxalate of lime, rosin, and water. All of which materially effect the result when mixed with, and during the process of incorporating the adhesive mixture with calcined gypsum, and in allowing the water to be expelled without chemically uniting with the calcined gypsum, and play a very important part in the ultimate power of the compound to set or solidify as a true cement, as well as in the advantageous properties of the practical working of the material when applied as a wall finish, and in the permanency and beauty of the wall coating when applied.

In the practical application of my invention, the incorporation of the adhesive mixture with the calcined gypsum may be made in an open receptacle, or closed until the mass is heated about to the boiling point of water, when the water should be allowed to evaporate. The mixing of the ingredients may be effected by any suitable means, either by stirring, grinding or rubbing together. The adhesive mixture may be incorporated with cold calcined gypsum, then heat applied to expel the water, or the calcined gypsum may be first heated for the purpose, or advantage may be taken of the heat contained in the calcined gypsum at the termination of the calcining process, or by regulating the heat the liquid adhesive mixture may be introduced directly into the calcining kettle at the completion of the calcining process, and there stirred until dry. In having the calcined gypsum hot at the time of adding the adhesive mixture the heat facilitates the mixing process, and the process of drying is under way while the mixing is in progress.

In drying this compound the temperature should not generally be allowed to go above 212° Fahrenheit, but with care it may be somewhat increased to hasten the process of drying. While for economy it may be advisable to dry the compound soon after mixing the ingredients, I do not wish it understood as a necessary step, as I have obtained good results where the compound has not been dried for several days after mixing my new adhesive mixture with calcined gypsum, and in which there was no sign of chemical union of the water with the calcined gypsum, however, it had not lost the power of ultimately setting as a true cement.

I claim—

1. The process of manufacturing a wall coating compound, which consists of the following steps: first, adding water to animal glue, then adding lime, then boiling the mixture, then adding oxalic acid and rosin, then incorporating the adhesive mixture with calcined gypsum, drying the compound, and subsequently reducing the product to a very fine powder, substantially as described.

2. As a composition of matter an adhesive wall coating, compound of calcined gypsum, "metagelatin," oxalate of lime, and rosin, in about the proportions stated.

EDWARD WATSON.

Witnesses:
GEO. H. DAVIDSON,
ROBERT ALEXANDER MATHESON.